United States Patent

Onda et al.

[11] 3,829,878
[45] Aug. 13, 1974

[54] FOCAL PLANE SHUTTER WITH GROUPS OF SHUTTER BLADES

[75] Inventors: Eiichi Onda, Misato; Mitsuo Koyama; Tadashi Nakagawa, both of Chiba, all of Japan

[73] Assignee: Seiko Koki Kabushiki Kaisha, Tokyo, Japan

[22] Filed: Sept. 12, 1973

[21] Appl. No.: 396,434

[30] Foreign Application Priority Data
Sept. 14, 1972  Japan............................ 47-107061

[52] U.S. Cl................. 354/246, 354/249, 354/250
[51] Int. Cl............................................. G03b 9/36
[58] Field of Search........... 95/53 R, 55, 58, 59, 60

[56] References Cited
UNITED STATES PATENTS
2,975,689   3/1961   Chatani................................. 95/55
3,580,156   5/1971   Loseries................................ 95/60
3,628,438   12/1971  Loseries................................ 95/55
3,683,778   8/1972   Weiss.................................... 95/60

*Primary Examiner*—Samuel S. Matthews
*Assistant Examiner*—Russell E. Adams, Jr.
*Attorney, Agent, or Firm*—Robert E. Burns; Emmanuel J. Lobato; Bruce L. Adams

[57] ABSTRACT

A focal plane shutter having two groups of shutter blades. One group opens the shutter and the other closes it. The groups each have a slit-forming shutter blade translated on a pair of levers. The remaining blades of each group are pivoted and pivotally actuated. The slit-forming shutter blades each have a straight edge moved across the shutter aperture normal to a plane traversing the shutter aperture so that the exposure aperture is accurately developed as the shutter is opened or closed. The pivoted blades have an angle of movement that is minimum.

3 Claims, 5 Drawing Figures

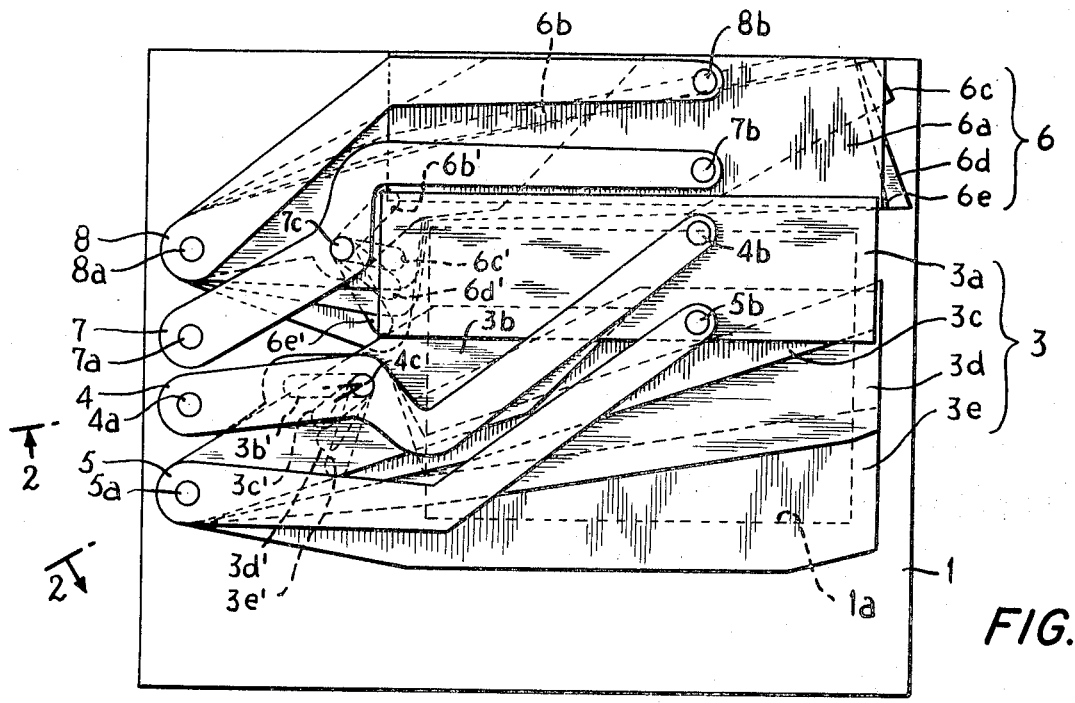

3,829,878

FOCAL PLANE SHUTTER WITH GROUPS OF SHUTTER BLADES

BACKGROUND OF THE INVENTION

This invention relates generally to camera shutters and more particularly to focal plane shutters.

In camera shutters wherein the shutter blades are arranged in groups the driving parts of a group are pivotally mounted separately from the shutter blades which are likewise pivotally mounted. This results in increased bulkiness of the shutters and a more complex construction. In focal plane shutters constructed with a plurality of groups of shutter blades the blades tend to be large because of the large exposure aperture. Thus the use of shutter blades divided into groups in miniature focal plane shutters presents special problems.

SUMMARY OF THE INVENTION

It is a principal object of the present invention to provide a new and improved focal plane shutter in which the shutter blades are divided into two groups and constructed with smaller components and smaller shutter blades.

The focal plane shutter according to the invention has two opposed plates spaced from each other defining a space within which are housed two sets or groups of shutter blades. The two plates have openings in registry that define the shutter aperture. The shutter blades are divided into groups. A first group is normally in a first operative position closing the shutter aperture when the shutter is in a cocked condition and are operable to a second operative position opening the shutter aperture. A second group of shutter blades is normally disposed in a first operative position in which the shutter is closed by the first group. This second group is operable to a second operative position closing the shutter-aperture. Each group of shutter blades has a slit-forming shutter blade that has a straight edge for accurately defining the exposure aperture as the shutter aperture is opened and closed. The straight edges move parallel to their rest positions as they traverse the shutter aperture. The straight edge of the first group is a trailing edge accurately opening the shutter aperture and the straight edge of the second group is a leading edge accurately closing the shutter aperture.

Each group of shutter blades has a pair of levers for supporting and transporting the corresponding slit-forming shutter blade. One of these levers is a driven lever and the other is an auxiliary lever. The levers of all the groups are pivotally mounted in a common plane alongside the shutter aperture. The free end of these levers are connected to their slit-forming shutter blades so that the slit-forming straight edges traverse the exposure aperture in parallel positions. That is to say these edges move parallel to their rest positions and normal to a plane that traverses the exposure aperture and in which lie the connections of the free ends of the levers to the slit-forming shutter blades.

The driven levers and the shutter blades are superposed so that the driven levers can actuate the corresponding slit-forming shutter blade and the remainder of the shutter blades of its group through a pin extending from it through slots of different lengths in the remainder of shutter blades. In a second embodiment a separate drive drives the driven lever in conjunction with the remainder of shutter blades. In each case the blades are driven in a sequence from a superposed position to a fan-shaped arrangement closing the exposure aperture.

BRIEF DESCRIPTION OF THE DRAWINGS

Other features and advantages of the focal plane shutter in accordance with the invention will be better understood as described in the following specification, and appended claims with the following drawings in which:

FIG. 1 is a plan view of a focal shutter according to the invention illustrated in a cocked condition;

FIG. 2 is a section view taken along section line 2—2 of FIG. 1;

FIG. 3 is a plan view of the focal plane shutter in FIG. 1 illustrated in an open condition for taking of a photographic exposure;

DESCRIPTION OF THE PREFERRED EMBODIMENTS

Figure 4:
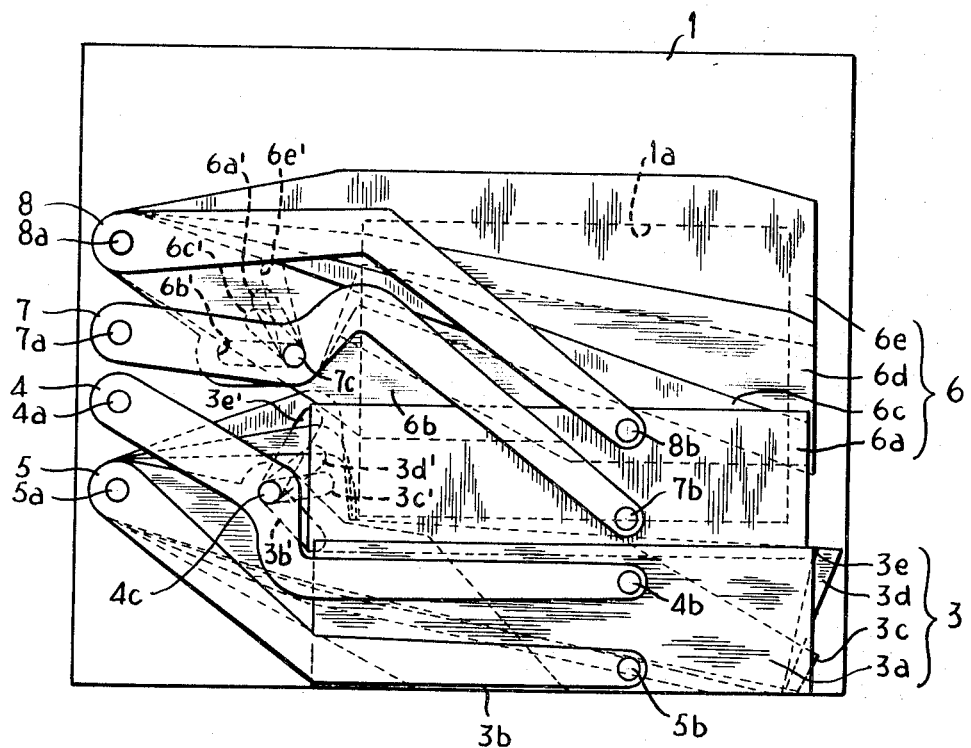
FIG. 4 is a plan view of the focal plane shutter in FIG. 3 illustrated in a closed condition subsequent to the taking of a photographic exposure.

As shown in the drawings a focal plane according to the invention has a baseplate 1 which has an opening 1a thereon. A second or press plate 2 is disposed opposed to or confronting the baseplate 1 and has an opening 2a in registry with the other opening defining an exposure aperture. The plates are held spaced from each other in fixed positions by spacers, not shown, and jointly define a space therebetween. The two plates may have a similar configuration.

Within the space between the plates are housed the shutter blades divided into two groups 3,6. A first group 3 is a shutter-opening group of shutter blades that close the shutter when in a first operative position when the shutter is cocked as shown in FIG. 1. They are operable to a second operative position as shown in FIG. 3 in which the shutter is open. The second group of shutter blades 6 has a normal first operative position in which the blades are superposed alongside the shutter aperture and are operable to a second operative position closing the shutter aperture as shown in FIG. 4.

The first or shutter-opening group of shutter blades comprises an opening slit-forming shutter blade 3a and pivotally mounted covering blades 3b,3c,3d,3e. The slit-forming shutter blade is carried or transported by a dog-leg-shaped driven lever 4 pivoted on a pivot 4a and having a free end connected at 4b to the slit-forming shutter blade and by an auxiliary lever 5 made as two straight parts which are extensions of each other and at an angle to each other. The auxiliary lever is pivoted on a pivot 5a and is connected at 5b to the slit-forming shutter blade. The remainder of the group of blades are superposed and pivoted at the pivot 5a in common with the auxiliary lever 5.

The second or shutter-closing group of shutter blades 6 constitute a slit-forming shutter blade 6a transported on a dog-leg-shaped driven lever 7 pivoted on a pivot 7a and having a free end connected at 7b to the slit-forming shutter blade 6a. An auxiliary lever 8 helps in transporting or translating the second slit-forming shutter blade and is pivoted on a pivot 8a and has a free end connected at 8b to the slit-forming shutter blade 6a. The remainder of the blades 6b-6e are pivoted on the pivot 8a of the group's auxiliary lever 8.

The slit-forming shutter blades each have a straight edge that functions to accurately define the shutter exposure aperture as it is opened or closed. The straight edge of the first group slit-forming shutter blade 3a functions as a trailing edge as the shutter is opened. The straight edge of the second group slit-forming shutter blade 6a functions as a leading edge as the shutter is closed. The pivots of the paired levers carrying the two slit-forming shutter blades 3a,6a are disposed in a common plane alongside the shutter aperture 1a,2a. The pivots of the paired levers and the free-end connections on the slit-forming shutter blades are spaced from each other as shown. The positions and spacing of these pivots and free-end connections insure that the straight edges of the slit-forming shutter blades move across the shutter aperture parallel to their rest positions or normal to the plane in which the free end connections lie. Thus the exposure aperture is always accurately formed as the groups of blades are operated. It will be noted the two sets of shutter blades and their paired levers are mirror images of each other.

The shutter blades are driven to their second operative positions for opening and closing the shutter. When the shutter-operating mechanism is operated for opening the shutter the pivot 4a is rotated clockwise by a spring not shown actuating the driven lever 4 and it moves the slit-forming shutter blade 3a connected thereto and its paired auxiliary lever 5 is carried along and the parallel movement of the slit-forming shutter blade takes place.

The driven lever 4 is provided with a pin 4c that extends through elongated slots 2b'-3e' on the remainder of pivotally driven blades 3b-3e. These latter shutter blades are pivotally driven by the driven lever 4 sequentially, because of the various lengths of the slots, from a fan-shaped position to a superposed position alongside the shutter aperture so that the shutter is opened as shown in FIG. 3.

The shutter is closed when the exposure is completed. The shutter-operating mechanism, not shown, releases the pivot 7a of the driven lever 7 of the shutter-closing group and the pivot is driven clockwise by a spring not shown so that the leading edge of the slit-forming shutter blade 6a is advanced parallel as before described in conjunction with the auxiliary lever 8. The driven lever 7 has a pin 7c that extends into different length elongated slots 6b'-6e' formed in the remainder of the shutter blades 6b-6e. This pin drives these blades sequentially so that the blades are moved from their superposed position to a fan-shaped position closing the shutter as shown in FIG. 4.

The shutter is cocked or charged by actuating cocking mechanism, not shown, by actuating either the driven levers 4,7 or the auxiliary levers 5,8 in a direction against the force of the springs that drives the pivots of the driven operating levers.

Figure 5:
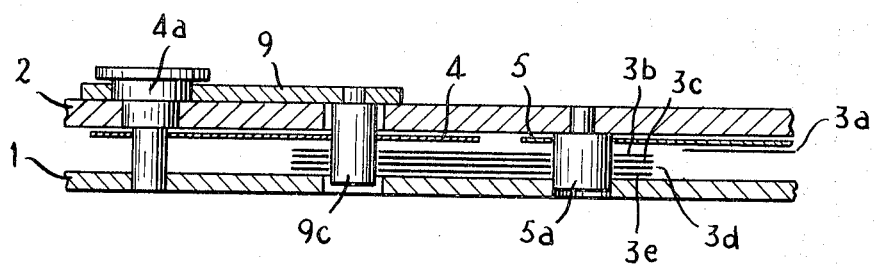
FIG. 5 is a cross section view of a second embodiment of a focal plane shutter according to the invention.

A second embodiment of a focal plane shutter embodying the invention is illustrated in FIG. 5 wherein parts corresponding to those already described have the same reference numerals for ease of understanding the similarities and differences of the two embodiments. The focal plane shutter has two plates 1,2 spaced from each other defining a space therebetween in which are housed two sets or groups of shutter blades as before. Only the slit-forming shutter blade 3a and the remainder of pivoted shutter blades 3b-3e of a first group are seen. The auxiliary lever 5 and its pivot 5a are likewise illustrated. This embodiment is different in that the pivot 4a for the driven lever 4 mounts a driving lever or element 9 coaxially with the driven lever. This driving element 9 is mounted outside the space between the plates on the press plate 2. It is driven by a spring not shown that provides the motive power for the shutter-opening group of shutter blades 3 in place of the motive power applied to the pivot of the driven lever 4. The driving element has a pin 9c that extends through an opening in the press plate 2 and into elongated slots in the driven lever 4 and the blades 3b-3e other than the slit-forming blade 3a. When the driving lever 9 is actuated it drives the driving lever for driving the slit-forming shutter blade as before and driving the remainder of the blades which are pivoted, as before described.

The second group of blades need not be described nor illustrated since they are constructed as before described with a lever corresponding to the driving lever 9 as shown with the first group 3 illustrated in FIG. 5.

An advantage of this second embodiment is that the driving levers can be made stronger for applying the driving force thereto. The driving force cannot be applied to thin blades. The motion can be carried out smoothly.

As can be seen the focal shutter according to the invention has several advantages in that a smaller number of blades is used. The drive pins 4c,7c on the driven levers may be made relatively thick so that very stable movement of the shutter blades is possible. The shutter blades' free ends carry out better light interruption even though they don't all extend across the exposure aperture 1a,2a. The angle of movement of the pivoted blades, 3b-3e and 6b-6e, is less than before. The movement of the levers is accordingly less. The distance between the driving pins 4c,7c and the supporting auxiliary pivots 5a,-8a can be made relatively large and this stabilizes the position and movement of the free ends of the pivoted blades of the two groups. It is also possible to reverse the arrangement of the driven levers with their corresponding paired auxiliary levers.

What we claim and desire to secure by letters patent is:

1. In a focal plane shutter, in combination, a pair of opposed plates defining a space therebetween and each having registering apertures defining a shutter aperture, two groups of shutter blades constituting a first group for opening the shutter aperture normally in a first operative position closing the shutter aperture when the shutter is in a cocked condition and operable to a second operative position opening the shutter aperture, and a second group of shutter blades normally disposed in a first operative position alongside the shutter aperture and operable to a second operative position for closing the shutter to terminate a photographic exposure, each group of shutter blades having a slit-forming shutter blade having a straight edge for travelling across the shutter aperture, the slit-forming shutter blade in the first group of shutter blades constituting a trailing shutter blade and said straight edge thereon constituting a trailing edge controlling defining of an increasing exposure aperture slit as the shutter aperture is opened, the slit-forming shutter blade in the second group of shutter blades constituting a leading shutter blade and said straight edge thereon constituting a leading edge controlling defining of a decreasing exposure aperture slit as the shutter aperture is closed, each group of shutter blades having a driven lever pivotally mounted on one end and a free end thereof connected to said slit-forming shutter blade of the corresponding group of shutter blades, each group of shutter blades having an auxiliary lever pivotally mounted at one end and a free end thereof connected to said slit-forming blade of the corresponding group, the free ends of the auxiliary levers of each group being connected to the corresponding slit-forming shutter blades at a common plane passing through said shutter aperture, means pivotally mounting the driven levers and auxiliary levers independently on a common plane passing alongside the shutter aperture, driving means for each group for driving the remainder of the shutter blades of each group other than the slit-forming shutter blade of each group in conjunction with said driven lever thereof, the means pivotally mounting the auxiliary lever for each group pivotally mounting the remainder of said shutter blades at a common pivot with the corresponding auxiliary lever for pivoting about a common pivot in the same plane in which the driven levers and auxiliary levers pivot, the levers of said first group being a mirror image of the second group, and the driven lever and remainder of shutter blades of each group being superposed.

2. In a focal plane shutter according to claim 1, in which said driven lever of each group is dog-leg-shaped, and in which the auxiliary lever of each group has two straight parts as continuations of each other and disposed at an angle to each other.

3. In a focal plane shutter according to claim 1, in which said driving means comprises an actuating pin extending from the driven lever of a group through said remainder of shutter blades of the same group, and said remainder of shutter blades having elongated slots of various lengths into which said pin extends disposed for actuation to positions in which said remainder of blades are arranged fan-shaped.

* * * * *